(12) United States Patent
Chen et al.

(10) Patent No.: US 6,364,536 B1
(45) Date of Patent: Apr. 2, 2002

(54) FLOATING CONNECTOR ASSEMBLY

(76) Inventors: Wenzong Chen, 959 Honest Pleasure Dr., Naperville, IL (US) 60540; Jeffrey A. Matasek, N40 W7153 Wilson St., Cedarburg, WI (US) 53012; Igor Grois, 4010 Greenacre Dr., Northbrook, IL (US) 60062

( * ) Notice: Subject to any disclaimer, the term of this patent is extended or adjusted under 35 U.S.C. 154(b) by 0 days.

(21) Appl. No.: 09/539,629

(22) Filed: Mar. 30, 2000

(51) Int. Cl.⁷ ................................................ G02B 6/38
(52) U.S. Cl. .......................................... 385/59; 385/70
(58) Field of Search ............................. 385/60, 53–58, 385/88–89, 139, 70–71

(56) References Cited

U.S. PATENT DOCUMENTS

| | | | |
|---|---|---|---|
| 5,121,454 A | | 6/1992 | Iwano et al. ................. 385/60 |
| 5,125,056 A | * | 6/1992 | Hughes et al. ............... 385/59 |
| 5,542,015 A | | 7/1996 | Hultermans .................. 385/60 |
| 5,764,834 A | | 6/1998 | Hultermans .................. 385/60 |
| 5,960,138 A | * | 9/1999 | Shimoji et al. .............. 385/58 |
| 6,076,975 A | * | 6/2000 | Roth ........................... 385/76 |

OTHER PUBLICATIONS

Diamond Fiber Optic Components product bulletin, undated.

* cited by examiner

*Primary Examiner*—John D. Lee
*Assistant Examiner*—Jerry T Rahll
(74) *Attorney, Agent, or Firm*—A. A. Tirva

(57) ABSTRACT

A floating connector assembly is provided for mounting through an aperture in a panel, the aperture defining an axis. The assembly includes an adapter mountable in the aperture in the panel. A two-part connector includes a fixed part fixed to a substrate and a movable part relatively movable axially in the fixed part. A first latch is provided between the two parts of the connector to prevent the relative axial movement therebetween. A second latch is provided between the adapter and the movable part of the connector when the movable part is mated with the adapter. A release is provided on the adapter for releasing the first latch between the two relatively movable parts of the connector to allow the fixed part of the connector and the substrate to float relative to the adapter and the panel.

17 Claims, 9 Drawing Sheets

FLOATING CONNECTOR ASSEMBLY

FIELD OF THE INVENTION

This invention generally relates to the art of connector assemblies, such as electrical connectors, fiber optic connectors and the like, and particularly to a system for mounting a connector assembly with floating movement between components of the assembly.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies or other connectors assemblies, including applications involving backplanes, mother boards, daughter boards and the like. One problem in such applications involving backplanes, mother boards, daughter boards and like components is to accommodate manufacturing tolerances and other system design parameters which dictate that some degree of "floating" movement be provided between the components. Unfortunately, when providing relative or floating movement between the components, it often becomes very difficult to mate the connectors of the connector assemblies. It is more desirable to have the connector assemblies fairly rigid, at least in the axial or insertion direction, so that the connectors can be readily mated, but the floating action is desirable after mating. The present invention is directed to solving this problem by providing a unique two-part connector mounted to a substrate and mateable with an adapter, with the two parts of the connector being rigid before mating and providing relative movement therebetween after mating. It should be understood that the concepts of the invention are applicable to connector assemblies other than fiber optic connectors, such as electrical connectors or the like.

SUMMARY OF THE INVENTION

An object, therefore, of the invention is to provide a new and improved floating connector assembly for mounting through an aperture in a panel, the aperture defining an axis.

In the exemplary embodiment of the invention, the connector assembly includes an adapter mountable in the aperture in the panel. A two-part connector includes a fixed part fixed to a substrate and a movable part relatively movable axially in the fixed part. Complementary interengaging first latch means are provided between the two parts of the connector to prevent the relative axial movement therebetween. Complementary interengaging second latch means are provided between the adapter and the movable part of the connector when the movable part is mated with the adapter. Release means are provided on the adapter for releasing the first latch means between the two relatively movable parts of the connector to allow the fixed part of the connector and the substrate to float relative to the adapter and the panel. The invention contemplates that the release means and the second latch means on the adapter comprise a single component.

According to one aspect of the invention, the complementary interengaging first latch means comprise at least one flexible latch arm on the relatively movable part of the connector engageable with a latch member on the fixed part of the connector. A pair of the latch members are spaced axially of the fixed part of the connector and between which the flexible latch arm floats when the movable part and the adapter are mated. Preferably, a pair of the flexible latch arms and respective latch members are provided on opposite sides of the connector assembly.

According to another aspect of the invention, the complementary interengaging second latch means comprise at least one flexible latch arm on the adapter engageable with a latch member on the relatively movable part of the connector. The flexible latch arm includes a chamfered distal end for engaging and releasing the first latch means generally transversely of the axis. The flexible latch arm includes a latch hook spaced axially of the chamfered distal end for engaging the latch member on the relatively movable part of the connector. Preferably, a pair of the flexible latch arms and respective latch members are provided on opposite sides of the connector assembly.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
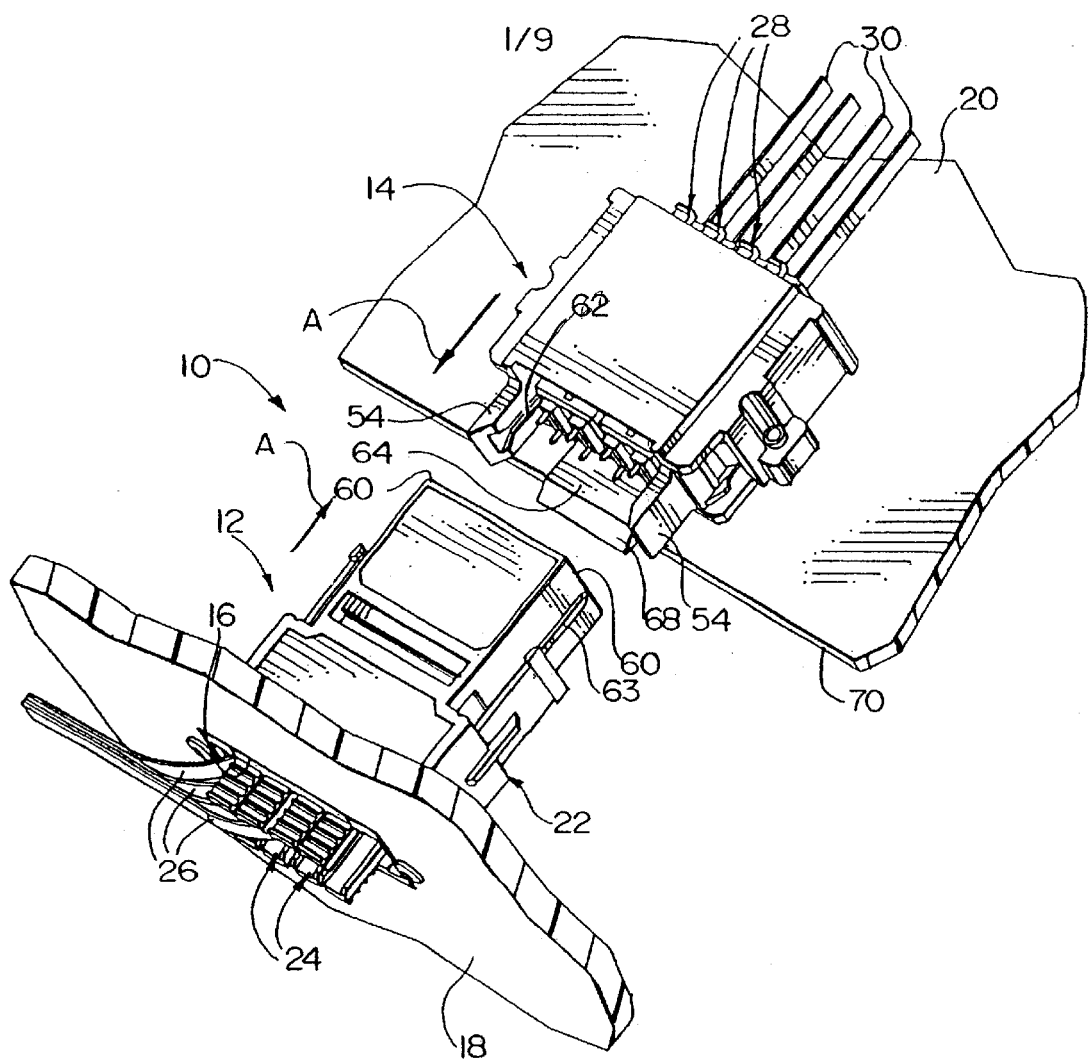
FIG. 1 is a perspective view of a mating connector assembly embodying the concepts of invention, with the assembly in unmated condition.
Figure 2:
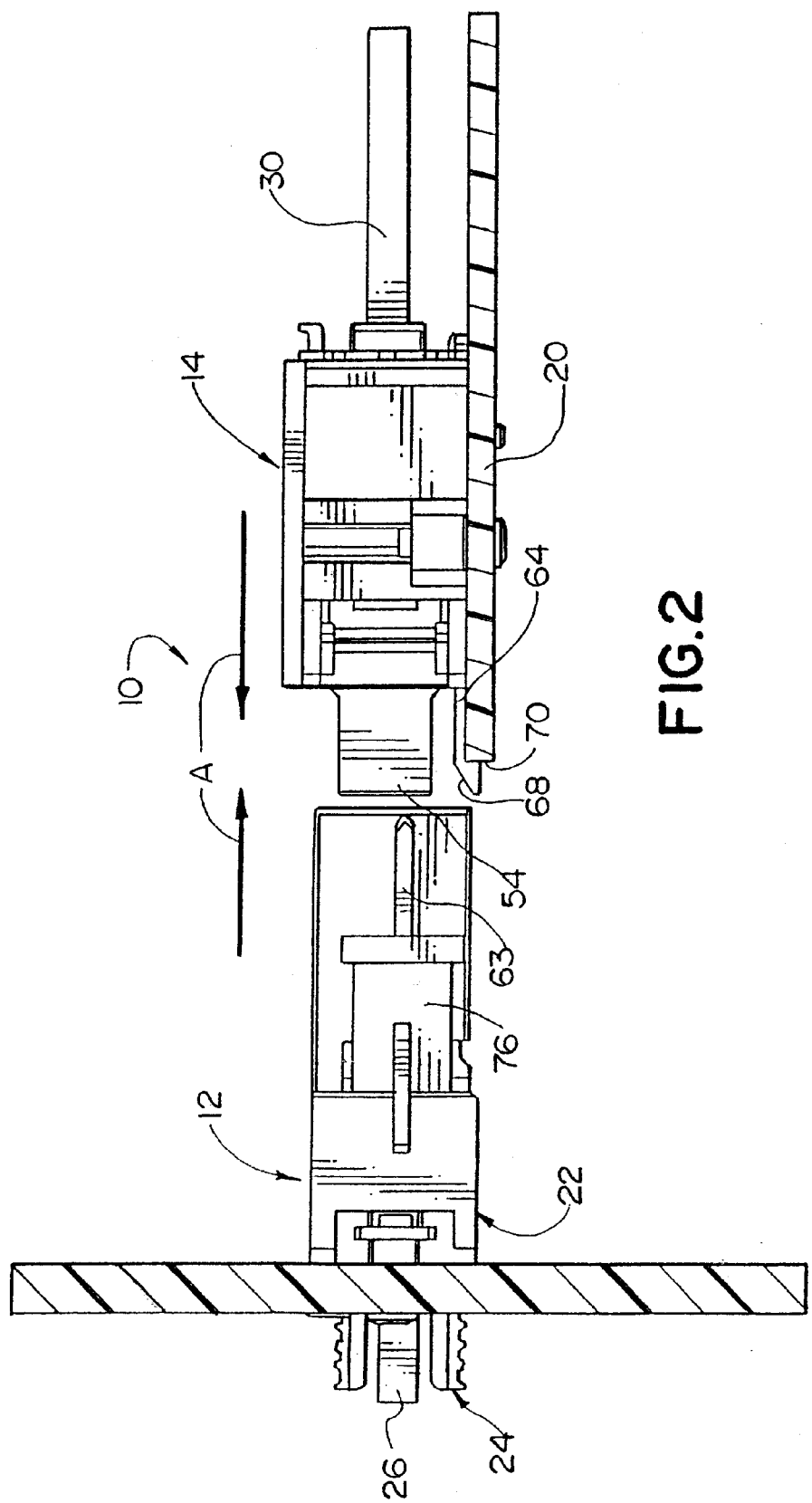
FIG. 2 is a side elevational view of the mating connector assembly as shown in FIG. 1.
Figure 3:
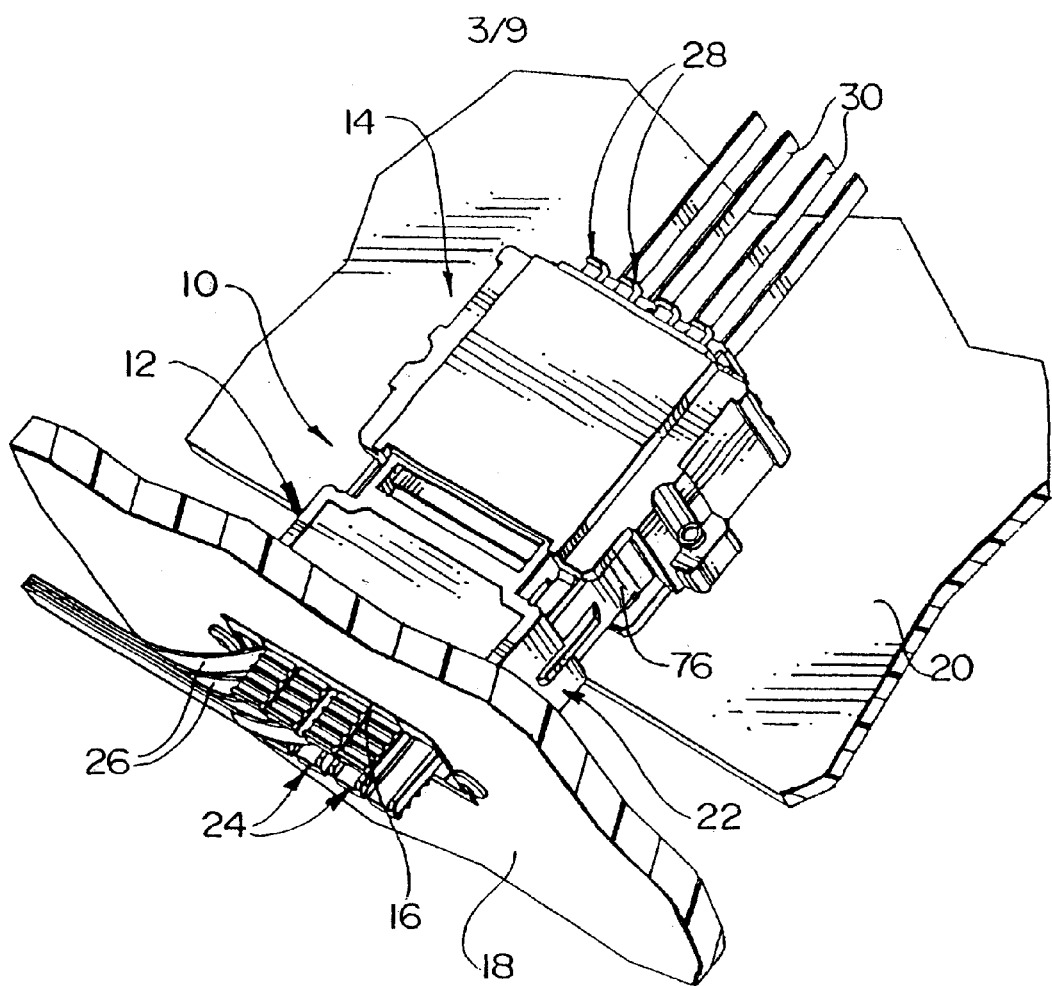
FIG. 3 is a perspective view of the mating connector assembly of FIG. 1, in mated condition.

Referring to the drawings in greater detail, and first to FIGS. 1–3, the invention is embodied in a mating connector assembly, generally designated 10, which includes a backplane connector assembly, generally designated 12, mateable with a daughter board connector assembly, generally designated 14. The backplane connector assembly is mounted in an aperture 16 in a substrate, panel or backplane 18 which, in the preferred embodiment, is a printed circuit board. Specifically, backplane 18 can be considered the "mother board" herein. The daughter board connector assembly is mounted on a top surface of a second printed circuit board 20 which is considered the "daughter board" herein.

Backplane connector assembly 12 includes an adapter, generally designated 22, which is mounted in aperture 16 in mother board 18. Four fiber optic connector modules, generally designated 24, are inserted into adapter 22, through aperture 16, from the front of backplane 18. Each fiber optic connector module is terminated to a multi-fiber cable 26. Each cable is a flat or "ribbon" cable having a plurality of optical fibers.

After daughter board connector assembly 14 is mounted on daughter board 20, four fiber optic connector modules, generally designated 28, are inserted into the rear of the connector housing, as described hereinafter. Each module 28 is terminated to a flat, multi-fiber cable 30 similar to fiber optic cables 26. Backplane connector assembly 12 and daughter board connector assembly 14 are mateable in the direction of arrows "A" (FIGS. 1 and 2) to a mated condition shown in FIG. 3, wherein the fibers of cables 26 and 30 are functionally connected.

Figure 4:
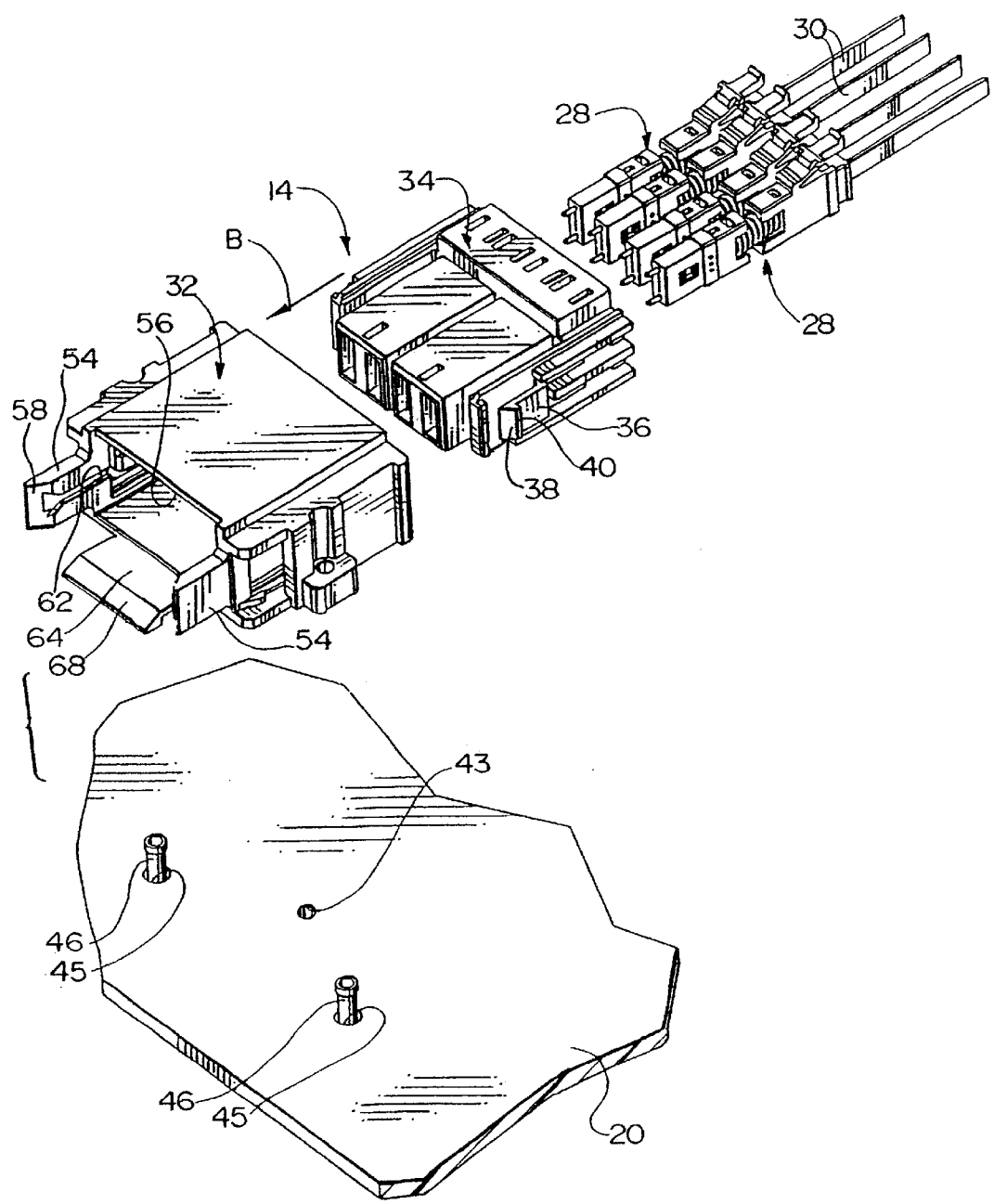
FIG. 4 is an exploded perspective view of the daughter board connector assembly as seen to the right of FIGS. 1–3.
Figure 5:
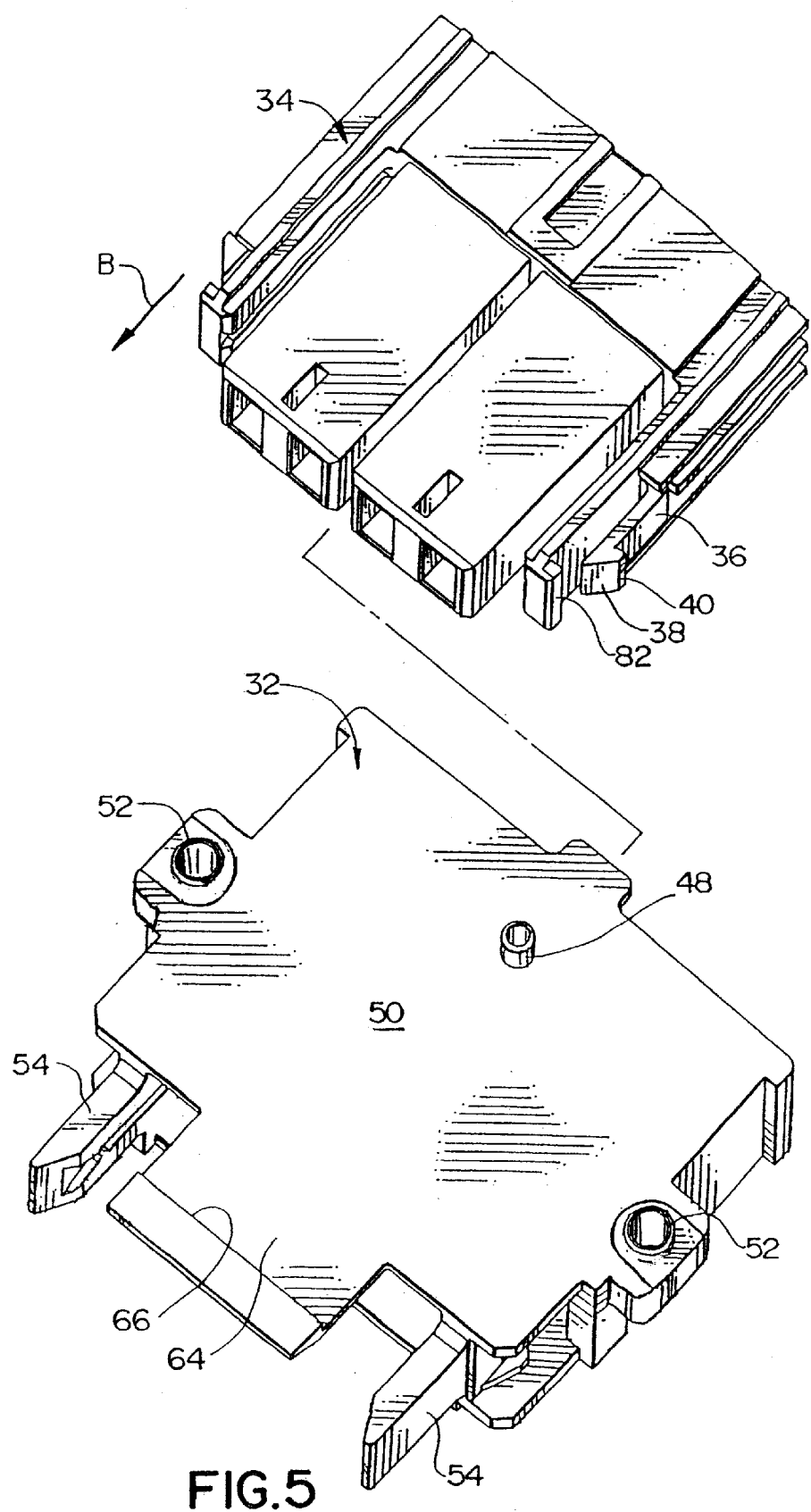
FIG. 5 is an exploded bottom perspective view of the two-part housing of the daughter board connector assembly.
Figure 6:
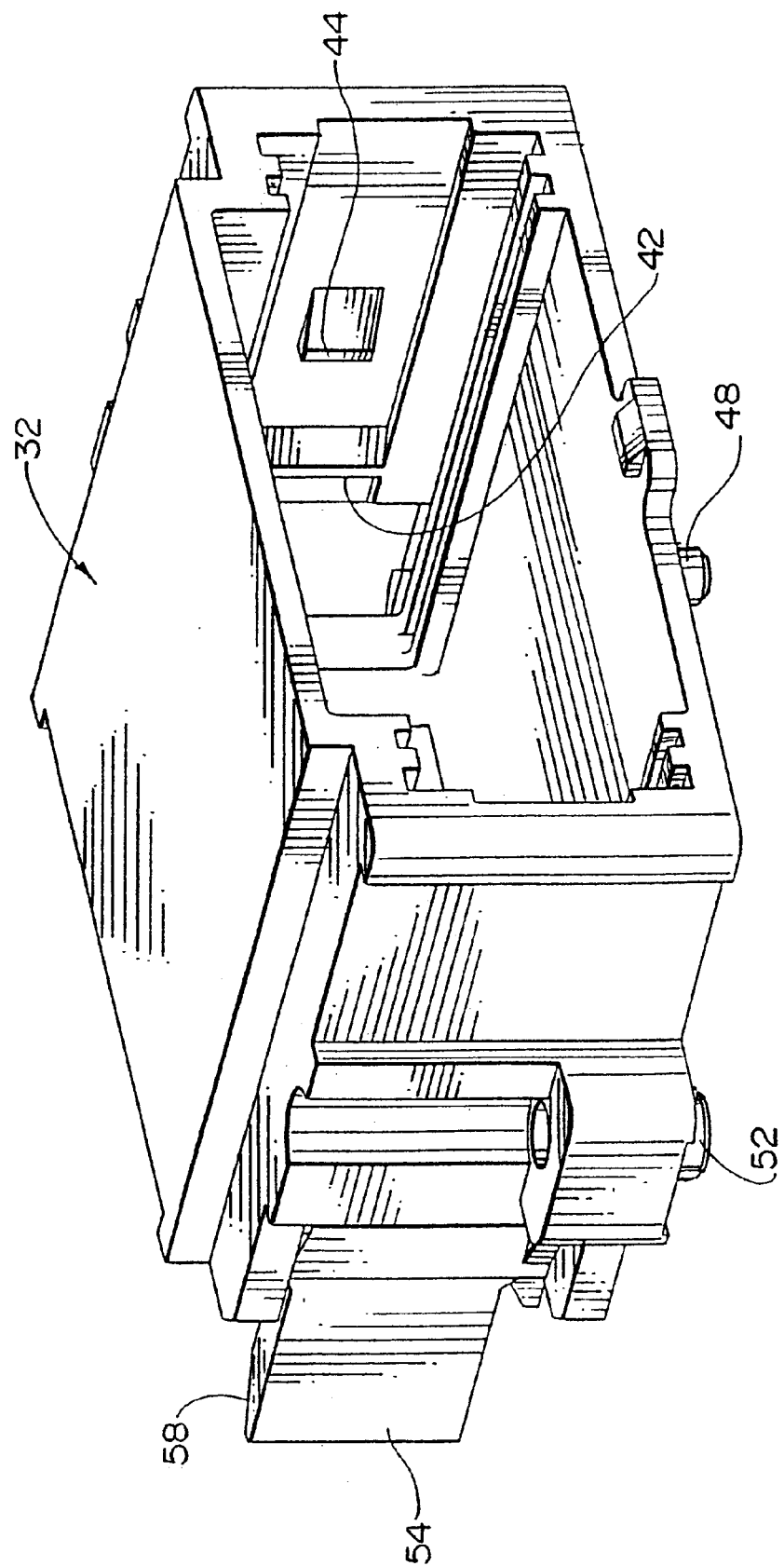
FIG. 6 is a perspective view of the front housing part of the daughter board connector assembly.

FIGS. 4–6 show daughter board connector assembly 14 to include a two-part housing defined by a front, fixed housing part, generally designated 32, and a rear, movable housing part, generally designated 34. The rear housing part is insertable into the front housing part in the direction of arrow "B" (FIG. 4). Rear housing part 34 has a flexible latch arm 36 on each opposite side thereof. Each latch arm has a chamfered front distal end 38 with a latch hook 40 immediately therebehind. The latch hook of each flexible latch arm latches behind a front latch shoulder 42 (FIG. 6) when the two housing parts are initially assembled. FIG. 6 also shows a second latch should 44 which is located rearwardly and spaced from front latch shoulder 42, for purposes described hereinafter. Each housing part 32 and 34 may be a one-piece structure unitarily molded of dielectric material such as plastic or the like.

Front or fixed housing part 32 of daughter board connector assembly 14 is mounted on daughter board 20. As seen in FIG. 4, the daughter board has a pre-placement hole 43 spaced between a pair of positioning holes 45. A pair of rivets 46 are insertable through positioning holes 45. As best seen in FIG. 5, a pre-positioning peg 48 projects downwardly from a bottom surface 50 of front housing part 32 for insertion into pre-placement hole 43 with substantially zero insertion forces. In other words, hole 43 is larger than peg 48. A pair of positioning pegs 52 project downwardly from surface 50 for insertion into positioning holes 45 in daughter board 20 by a press-fit to precisely fix the housing on the substrate or circuit board. Peg 48 may be solid, but pegs 52 are hollow for receiving rivets 46 therethrough to solidly fix the front housing part to the daughter board. Pre-placement peg 48 is longer than positioning pegs 52 so that it is easy for an operator to locate and insert pre-placement peg 48 into pre-placement hole 43. The housing then can be easily pivoted about peg 48 until positioning pegs 52 are aligned with positioning holes 45.

Front housing part 32 also includes a pair of alignment flanges 54 at opposite sides of an open mating end 56 (FIG. 2) of the front housing part. Each flange has an outwardly chamfered or flared distal end 58 which is engageable by the front edges 60 (FIG. 1) of adapter 22 upon mating of the two connector assemblies. Alignment flanges 54 have grooves or slots 62 on the insides thereof for receiving a pair of alignment ribs 63 (FIG. 1) on opposite sides of adapter 22. A bottom flange 64 projects forwardly of the front housing part flush with bottom surface 50 (FIG. 5) of the front housing part. The flange has a bottom hook portion 66 and a top chamfered portion 68. The bottom hook portion overlaps an edge 70 of daughter board 20. The top chamfered portion 68 is engageable by the front bottom edge of adapter 22 to prevent the bottom edge of the adapter from "stubbing" the front edge of the daughter board during mating of the connector assemblies.

Figure 7:
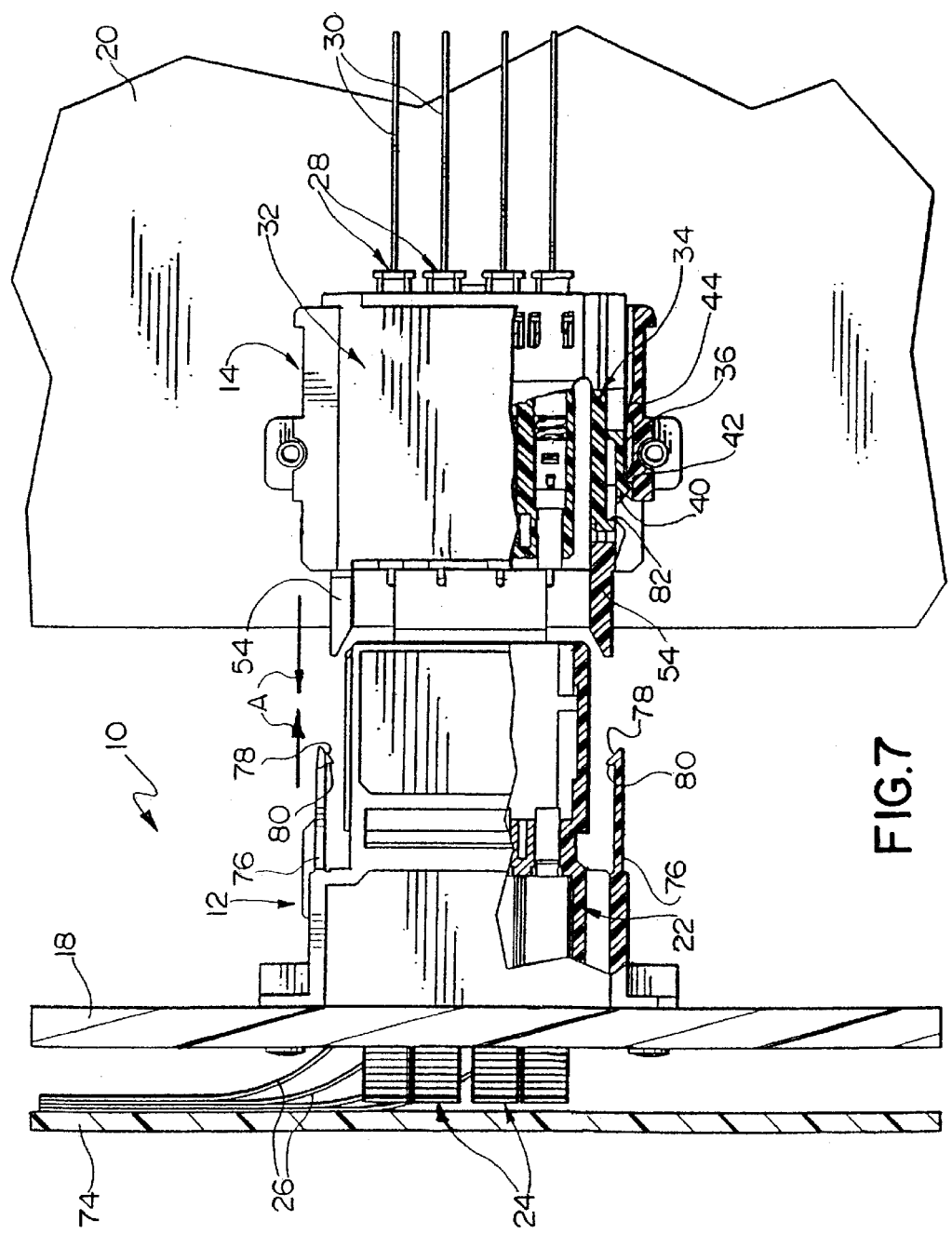
FIGS. 7–9 are sequential top plan views, partially broken away, showing the mating action of the mating connector assembly of FIGS. 1–3.
Figure 8:
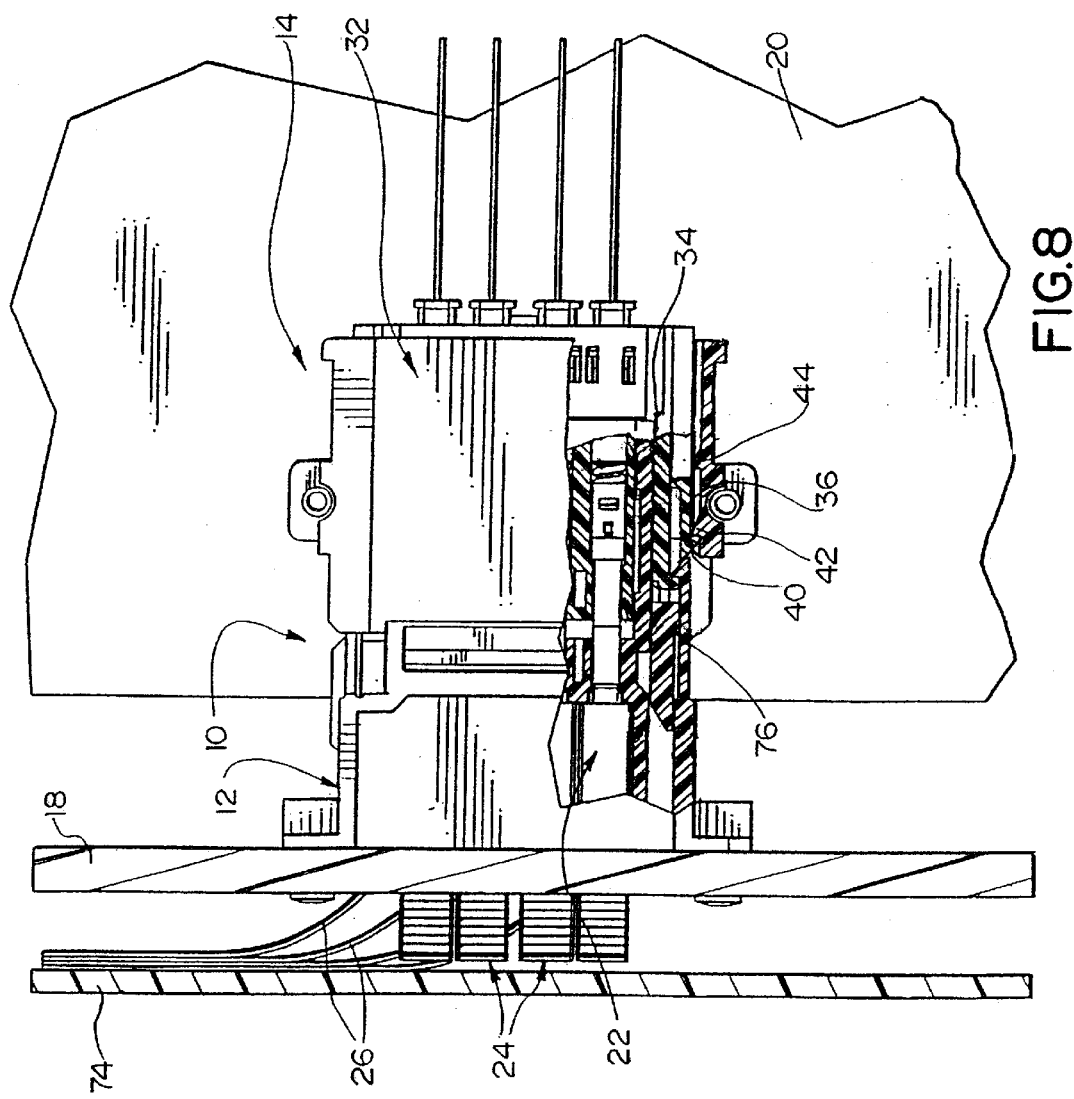
Figure 9:
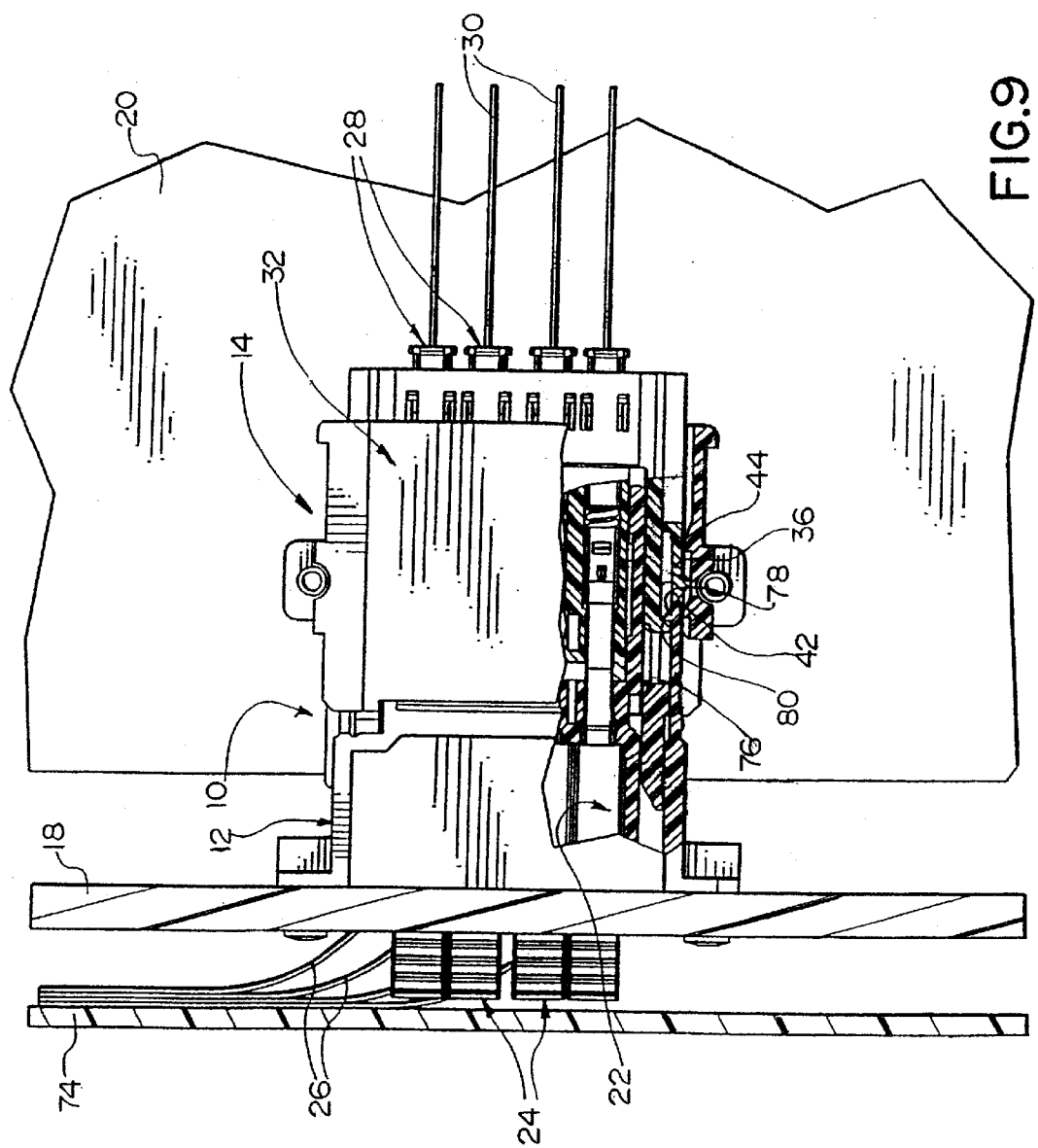

FIGS. 7–9 show the mating procedure of backplane connector assembly 12 and daughter board connector 14 in the direction of arrows "A", after the backplane connector assembly is mounted to panel or mother board 18 and after the daughter board connector assembly is mounted to daughter board 20. These depictions also show that fiber optic cables 26 are engaged with yet another substrate or board 74. Before proceeding, FIG. 7 best shows that adapter 22 of backplane connector assembly 12 has a pair of latch/release arms 76 spaced outwardly from opposite sides thereof. The latch/release arms have chamfered distal ends 78, with inside latch hooks 80 immediately behind the chamfered distal ends. Relatively movable housing part 32 has a pair of latch shoulders 82 on opposite sides thereof.

Backplane connector assembly 12 and daughter board connector assembly 14 are mateable in a two-step process represented by FIGS. 8 and 9. In the first step, hooks 80 of latch/release arms 76 snap behind latch shoulders 82 of movable housing part 34 of daughter board connector assembly 14. Latch hooks 40 on the ends of latch arms 36 at opposite sides of fixed housing part 32 already have latched behind latch shoulders 42 of fixed housing part 32. This prevents any rearward or other axial movement of any part of daughter board connector assembly 14 in response to the preliminary latching of backplane connector assembly 12 thereto. In other words, relative movement between housing parts 32 and 34 of the daughter board connector assembly is prevented.

Further movement of the connectors in the mating direction causes chamfered distal ends 78 of latch/release arms 76 of adapter 22 to engage the chamfered distal ends 38 of latch arms 40 of movable housing part 34 to move the latch arms transversely inwardly out of engagement with latch shoulders 42. Latch hooks 40 of latch arms 36 now are free to move between latch shoulders 42 and latch shoulders 44 of fixed housing part 32 to provide a degree of floating movement between the two housing parts in the axial or mating direction of the connector assembly. In other words, there is no floating movement between the housing parts and, therefore, the connector assemblies until mating occurs and the latch means between relatively movable housing parts 32 and 34 of the daughter board connector assembly is released.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A floating connector assembly for mounting through an aperture in a panel, the aperture defining an axis, comprising:

an adapter mountable in the aperture in the panel;

a two-part connector including a fixed part fixed to a substrate and a movable part relatively movable axially in the fixed part;

complementary interengaging first latch means between the two parts of the connector to prevent said relative axial movement therebetween;

complementary interengaging second latch means between the adapter and the movable part of the connector when the movable part is mated with the adapter;

release means on the adapter for releasing the first latch means between the two relatively movable parts of the connector to allow the fixed part of the connector and the substrate to float relative to the adapter and the panel; and said release means and the second latch means on the adapter comprising a single component.

2. The floating connector assembly of claim 1 wherein said complementary interengaging first latch means comprise at least one flexible latch arm on the relatively movable part of the connector engageable with a latch member on the fixed part of the connector.

3. The floating connector assembly of claim 2, including a pair of said flexible latch arms and respective latch members on opposite sides of the connector assembly.

4. The floating connector assembly of claim 2, including a pair of said latch members spaced axially of the fixed part of the connector and between which said flexible latch arm floats when the movable part and the adapter are mated.

5. The floating connector assembly of claim 1 wherein said single component comprises a flexible latch arm on the adapter engageable with a latch member on the relatively movable part of the connector.

6. The floating connector assembly of claim 5 wherein said flexible latch arm includes a portion thereof defining said release means for engaging and releasing the first latch means.

7. The floating connector assembly of claim 6 wherein said flexible latch arm includes a chamfered distal end for engaging and releasing the first latch means generally transversely of said axis.

8. The floating connector assembly of claim 7 wherein said flexible latch arm includes a latch hook spaced axially of said chamfered distal end for engaging the latch member on the relatively movable part of the connector.

9. The floating connector assembly of claim 5, including a pair of said flexible latch arms and respective latch members on opposite sides of the connector assembly.

10. The floating connector assembly of claim 1 wherein said adapter is configured for receiving a connector module for mating with the movable part of said connector within the adapter.

11. A floating connector assembly for mounting through an aperture in a panel, the aperture defining an axis, comprising:

an adapter mountable in the aperture in the panel;

a two-part connector including a fixed part fixed to a substrate and a movable part relatively movable axially in the fixed part;

complementary interengaging first latch means between the two parts of the connector to prevent said relative axial movement therebetween, including at least one first flexible latch arm on the relatively movable part of the connector engageable with a first latch member on the fixed part of the connector;

complementary interengaging second latch means between the adapter and the movable part of the connector when the movable part is mated with the adapter, including at least one flexible second latch arm on the adapter engageable with a second latch member on the relatively movable part of the connector; and said flexible second latch arm includes release means for releasing the first latch arm on the relatively movable part of the connector from the first latch member on the fixed part of the connector to allow the fixed part and the substrate to float relative to the adapter and the panel.

12. The floating connector assembly of claim 11, including a pair of said flexible first latch arms and respective first latch members on opposite sides of the connector assembly.

13. The floating connector assembly of claim 11, including a pair of said first latch members spaced axially of the fixed part of the connector and between which said flexible first latch arm floats when the movable part and the adapter are mated.

14. The floating connector assembly of claim 11 herein said flexible second latch arm includes a chamfered distal end for engaging and releasing the first latch arm generally transversely of said axis.

15. The floating connector assembly of claim 14 wherein said flexible second latch arm includes a latch hook spaced axially of said chamfered distal end for engaging the second latch member on the relatively movable part of the connector.

16. The floating connector assembly of claim 11, including a pair of said flexible second latch arms and respective second latch members on opposite sides of the connector assembly.

17. The floating connector assembly of claim 11 wherein said adapter is configured for receiving a connector module for mating with the movable part of said connector within the adapter.

* * * * *